United States Patent [19]
Fukui et al.

[11] Patent Number: 5,345,909
[45] Date of Patent: Sep. 13, 1994

[54] CONTROL APPARATUS FOR INTERNAL COMBUSTION ENGINE

[75] Inventors: Wataru Fukui; Noriaki Hayashi, both of Himeji, Japan

[73] Assignee: Mitsubishi Denki Kabushiki Kaisha, Tokyo, Japan

[21] Appl. No.: 83,305

[22] Filed: Jun. 29, 1993

[30] Foreign Application Priority Data

Jul. 7, 1992 [JP] Japan .................................. 4-179809

[51] Int. Cl.⁵ .......................................... F02P 67/077
[52] U.S. Cl. ..................... 123/414; 123/613
[58] Field of Search ................ 123/414, 613, 643, 594, 123/602, 617, 621; 73/118.1; 364/431.03

[56] References Cited

U.S. PATENT DOCUMENTS

| | | | |
|---|---|---|---|
| 4,979,487 | 12/1990 | Fukui | 123/643 |
| 5,047,943 | 9/1991 | Takahata et al. | 364/431.03 |
| 5,052,358 | 10/1991 | Fukui | 123/414 |
| 5,074,275 | 12/1991 | Fukui | 123/613 |
| 5,156,125 | 10/1992 | Fukui et al. | 123/414 |
| 5,168,853 | 12/1992 | Kittleson et al. | 123/419 |
| 5,186,144 | 2/1993 | Fukui | 123/414 |
| 5,245,968 | 9/1993 | Kolias et al. | 123/414 |
| 5,267,544 | 12/1993 | Ohkumo et al. | 123/414 |
| 5,269,274 | 12/1993 | Flaetgen et al. | 123/414 |

FOREIGN PATENT DOCUMENTS 4031129 4/1991 Fed. Rep. of Germany .
4037546 5/1991 Fed. Rep. of Germany .

*Primary Examiner*—Raymond A. Nelli
*Attorney, Agent, or Firm*—Sughrue, Mion, Zinn, Macpeak and Seas

[57] ABSTRACT

An apparatus for controlling operation of an internal combustion engine including a multiplicity of cylinders. The apparatus comprises a control means for detecting speedily reference positions for control of the individual cylinders with high reliability. In the control means, a reference position signal generating means for generating a reference position signal containing six equiinterval rectangular pulses each having a duty cycle of ½ during a single rotation of a crank shaft is provided in combination with a cylinder identification signal generating means for generating a plurality of different-interval rectangular pulses during a rotation of a shaft interlocked to the cam shaft so that a series of four successive signal levels of the different-interval rectangular pulses sampled at one edges of the equi-interval rectangular pulses differ from one to another succeeding series. The series of the signal levels thus fetched are stored in a signal level data storage means. A reference position determination unit is provided for generating a decision signal by determining the reference positions for the individual cylinders, respectively, on the basis of the four successive signal levels as stored.

6 Claims, 6 Drawing Sheets

| | LEVELS OF CP SIGNAL | | | | | | | | | DETECTION TIME POINT | |
|---|---|---|---|---|---|---|---|---|---|---|---|
| | n-7 | n-6 | n-5 | n-4 | n-3 | n-2 | n-1 | n | | FALLING EDGE OF TP | RISE-UP EDGE OF TP |
| A1 | 1 | 0 | 1 | 0 | 0 | 0 | 0 | 1 | | B105 | B75 |
| 42 | 0 | 1 | 0 | 0 | 0 | 0 | 1 | 0 | #1 | B45 | B15 |
| 85 | 1 | 0 | 0 | 0 | 0 | 1 | 0 | 1 | | A15 | A45 |
| 0B | 0 | 0 | 0 | 0 | 1 | 0 | 1 | 1 | | B105 | B75 |
| 17 | 0 | 0 | 0 | 1 | 0 | 1 | 1 | 1 | #3 | B45 | B15 |
| 2F | 0 | 0 | 1 | 0 | 1 | 1 | 1 | 1 | | A15 | A45 |
| 5E | 0 | 1 | 0 | 1 | 1 | 1 | 1 | 0 | | B105 | B75 |
| BD | 1 | 0 | 1 | 1 | 1 | 1 | 0 | 1 | #4 | B45 | B15 |
| 7A | 0 | 1 | 1 | 1 | 1 | 0 | 1 | 0 | | A15 | A45 |
| F4 | 1 | 1 | 1 | 1 | 0 | 1 | 0 | 0 | | B105 | B75 |
| E8 | 1 | 1 | 1 | 0 | 1 | 0 | 0 | 0 | #2 | B45 | B15 |
| D0 | 1 | 1 | 0 | 1 | 0 | 0 | 0 | 0 | | A15 | A45 |

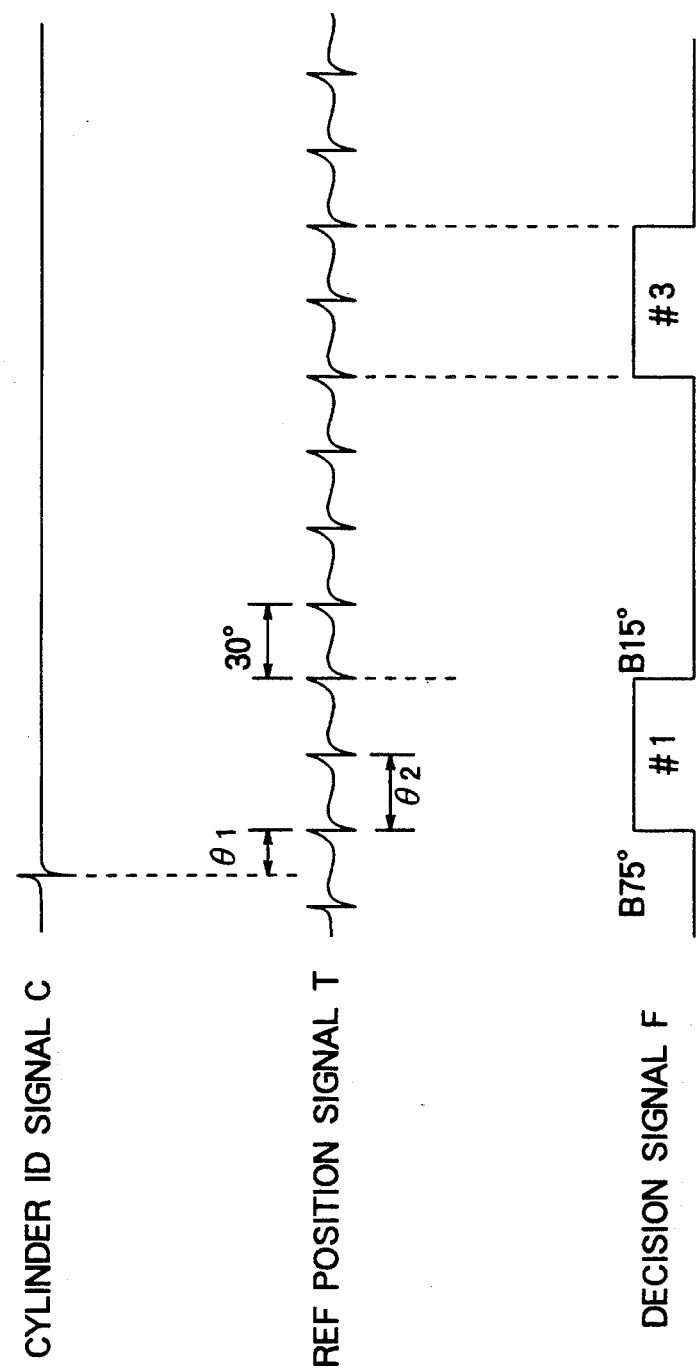

CONTROL APPARATUS FOR INTERNAL COMBUSTION ENGINE

BACKGROUND OF THE INVENTION

1. Field of the Invention

The present invention relates generally to an apparatus for controlling operation of an internal combustion engine (hereinafter also referred to simply as the engine) by controlling fuel injections, ignition timings and the like for the individual engine cylinders, respectively, on the basis of a reference position signal and a cylinder identification signal. More particularly, the invention is concerned with an engine control apparatus which can be applied to a multi-cylinder engine including a given number of cylinders and in which the reference positions for the individual cylinders can speedily be detected with high reliability.

2. Description of the Related Art

In general, in the multi-cylinder engine for an automobile or motor vehicle, it is required to control optimally the fuel injections and the ignition timings in dependence on the operation state of the engine or motor vehicle. To this end, there is provided a signal generating means inclusive of a sensor in association with a rotatable shaft of the engine for making available a reference position signal indicating reference positions for the individual engine cylinders and a cylinder identification signal for identifying a particular cylinder, respectively. Further, a microcomputer is used for detecting a reference crank angle position for each cylinder on the basis of the signals mentioned above and effectuating timer-based control operation on the basis of the reference positions for the cylinders by determining through calculation the control timings such as the ignition timings and the like.

FIG. 5 is a block diagram showing an engine control apparatus of the above-mentioned type known heretofore. Referring to the figure, this known engine control apparatus includes a reference position signal generating means 1 for generating a reference position signal T representing reference crank angle positions on a cylinder-by-cylinder basis in synchronism with rotation of a crank shaft of the engine (not shown) and a cylinder identification (ID) signal generating means 2 for generating a cylinder identification (ID) signal C for identifying a particular cylinder in synchronism with rotation of a shaft (e.g., a cam shaft) interlocked to the crank shaft and having a rotation frequency equal to a half of that of the crank shaft, and a variety of sensors (generally denoted by a reference numeral 3) for detecting the operation state of the engine such as a rotation speed (rpm) of the engine, loads thereof and others.

The reference position signal T, the cylinder identification signal C and the operation state signal D are inputted to a control means 4 which controls the engine on the basis of these signals and which includes a reference position determination unit 4 for deciding or determining the reference position for each engine cylinder on the basis of the reference position signal T and the cylinder identification signal C, and a timing determination unit 42 for generating a control signal for controlling the ignition timings or the like for the individual cylinders on the basis of the output signal F from the reference position determination unit 41 and the operation state signal D derived from the sensor set 3.

FIG. 6 is a perspective view showing typical structures of the reference position signal generating means 1 and the cylinder identification signal generating means 2, respectively. Referring to the figure, the reference position signal generating means 1 includes a signal disk 11 which is mounted on a crank shaft 10 and thus rotated in synchronism with the rotation of the engine and has twelve teeth or projections 12 of a magnetic material formed equidistantly along the outer peripheral edge of the disk 11, wherein an electromagnetic pick-up 13 is disposed in opposition to the array of the magnetic projections 13. The signal disk 11 with the magnetic projections 13 cooperates with the electromagnetic pick-up 13 to constitute the reference signal generating means 1.

On the other hand, the cylinder identification signal generating means 2 includes a cam shaft 20 which is operatively connected to the crank shaft 10 through a reduction gear train or the like transmission means so that the former is rotated at a speed (rpm) equal to a half of that of the latter. A second signal disk 21 is mounted on the cam shaft 20 for rotation therewith. This signal disk 21 has only one magnetic projection or tooth 22 formed on the outer peripheral edge thereof. A second electromagnetic pick-up 23 is disposed in opposition to a path along which the projection 22 rotates. The disk 21 having the projection 22 cooperates with the electromagnetic pick-up 23 to constitute the cylinder identification signal generating means 2.

FIG. 7 is a timing chart which illustrates the reference position signal T and the cylinder identification signal C together with the decision signal F on the assumption that the number of the engine cylinders to be controlled is four. As can be seen in this figure, the reference position signal T contains twelve pulses per rotation of the crank shaft 10 on the basis of which reference crank angle position signals representing, for example, a crank angle of B75° (indicating a crank angle 75° before the top dead center or TDC) and a crank angle of B15° respectively, for each of the cylinders.

On the other hand, the cylinder identification signal C has a period of 720° in terms of the crank angle for all the cylinders, because the cam shaft 20 rotates only once during a period in which the crank shaft 10 rotates twice. Thus, the inter-pulse intervals $\theta_2$ of the reference position signal T is 30° in terms of the crank angle.

Further, the cylinder identification signal C contains a single pulse generated once during the period of 720° for a particular cylinder (cylinder #1 in the case of the illustrated example), which pulse has a phase difference $\theta_1$ (e.g., about 15°) relative to the pulse of the reference signal position signal T.

Next, description will turn to operation of the known engine control apparatus shown in FIG. 5 by reference to FIGS. 6 and 7.

When the engine rotates, the reference position signal generating means 1 and the cylinder identification signal generating means 2 generate the reference position signal T and the cylinder identification signal C which have waveforms such as illustrated in FIG. 7, respectively. These signals T and C are supplied to the reference position determination unit 41 of the control means 3.

The reference position determination unit 41 determines the position of the pulse contained in the reference position signal T which pulse lags to the generation of the pulse of the cylinder identification signal C by the crank angle $\theta_1$ as the reference position B75° for the cylinder #1. Subsequently, the reference position determination unit 41 decides the reference positions for the individual cylinders on the basis of the reference position signal pulses T generated at every crank angle $\theta_2$ (=30°), to thereby generate the reference position decision signals F each indicating the reference positions B75° and B15° for each of the other cylinders.

In the case of the engine including four cylinders, the reference position decision signals F each containing the pulse which indicates the reference positions B75° and B15°, respectively, are successively generated for the cylinders #3, #4 and #2 in this sequence in succession to the generation of the reference position pulse signal for the cylinder #1 during a period corresponding to the crank angle of 720°.

Parenthetically, it should be mentioned that when the reference position signal generating means 1 which is configured to generate 24 pulses during a period corresponding to the crank angle of 720° is employed as illustrated in FIGS. 6 and 7, the engine control under consideration can be applied not only to the four-cylinder engine but also to a three-cylinder engine, a six-cylinder engine, an eight-cylinder engine and a twelve-cylinder engine (these engines may collectively be referred to as the multicylinder engine).

The timing control unit 42 detects the reference positions for the individual cylinders on the basis of the reference position decision signal F to thereby calculate the control quantity for controlling the ignition timing or the like in dependence on the engine operation state D, as a result of which the control signals for controlling the ignition timings for the individual cylinders are outputted. In that case, when the ignition timing is to advance, the timing control (based on a timer control) is performed with reference to the reference position of B75°, while when the ignition timing is to lag, the timing control is then performed with reference to the second reference position of B15°.

At this juncture, it should be noted that the pulses of the reference position signal T and the cylinder identification signal C are inherently of very short duration (spike-like pulse) because they are generated by using the electromagnetic pick-up devices 13 and 23. For this reason, there is a possibility that some noise may erroneously be detected as the reference position signal pulse and/or as the cylinder identification signal pulse. Further, because the cylinder identification signal C contains only one pulse for identifying discriminatively to the cylinder #1 during a period corresponding to the crank angle of 720°, a lot of time which will amount to 720° in the worst case will be required for detecting the reference positions for the individual cylinders.

As will be appreciated from the above description, the engine control apparatus known heretofore suffers from problems that the susceptibility to noise is high with the reliability of the reference position determination for the cylinder being degraded and that a lot of time is taken for detecting the reference positions for the individual cylinders.

SUMMARY OF THE INVENTION

In the light of the state of the art described above, it is therefore an object of the present invention to provide a control apparatus for controlling operation of a so-called multi-cylinder engine, which apparatus is capable of detecting speedily the reference positions for the individual cylinders with high reliability.

In view of the above and other objects which will become apparent as description proceeds, there is provided according to an aspect of the present invention an apparatus for controlling operation of an internal combustion engine including a plurality of cylinders, which apparatus comprises a reference position signal generating means for generating a reference position signal indicating reference positions for the individual cylinders of the engine in synchronism with rotation of a crank shaft of the engine, a cylinder identification signal generating means for generating a cylinder identification signal for identifying the engine cylinders in synchronism with rotation of a shaft interlocked to the crank shaft and having a rotation frequency (rpm) corresponding to a half of that of the crank shaft, and a control means for controlling operation of the engine cylinders on the basis of the reference position signal and the cylinder identification signal. The reference position signal is comprised of equi-interval rectangular pulses each having a duty cycle of $\frac{1}{2}$ and generated six times during a single rotation of the crank shaft, while the cylinder identification signal including different-interval rectangular pulses generated a number of times during a single rotation of the interlocked shaft at an edge of one of the equi-interval rectangular pulse such that the different-interval rectangular pulse signal includes a succession of four-signal-level series which differ one another. The control means includes a signal-level-series storage means for storing the signal-level series at every one edge of the equi-interval rectangular pulse, a reference position decision means for deciding the reference positions for the individual cylinders on the basis of four successive values of the signal-level series for thereby generating a decision signal, and a timing control means for controlling operation of the individual cylinders on the basis of the decision signal.

By virtue of the arrangement of the present invention that levels of the cylinder identification signal comprised of different-interval rectangular pulses generated in synchronism with the rotation of the interlocked shaft are fetched at the edges of the equi-interval rectangular pulses contained in the reference position signal generated in synchronism with the rotation of the crank shaft, the reference positions for the individual cylinders can be decided on the basis of a series or sequence of the cylinder identification signal levels, whereby the timing control can be performed on the basis of the decision signal with the improved reliability.

The above other objects, features and attendant advantages of the present invention will more clearly be understood by reading the following description of the preferred embodiments thereof taken, only by way of example, in conjunction with the drawings.

BRIEF DESCRIPTION OF THE DRAWINGS

FIG. 7 is a timing chart for illustrating operation of the control apparatus shown in FIG. 5.

DESCRIPTION OF THE PREFERRED EMBODIMENTS

Now, the present invention will be described in detail in conjunction with the preferred or exemplary embodiments thereof by reference to the drawings.

Figure 1:
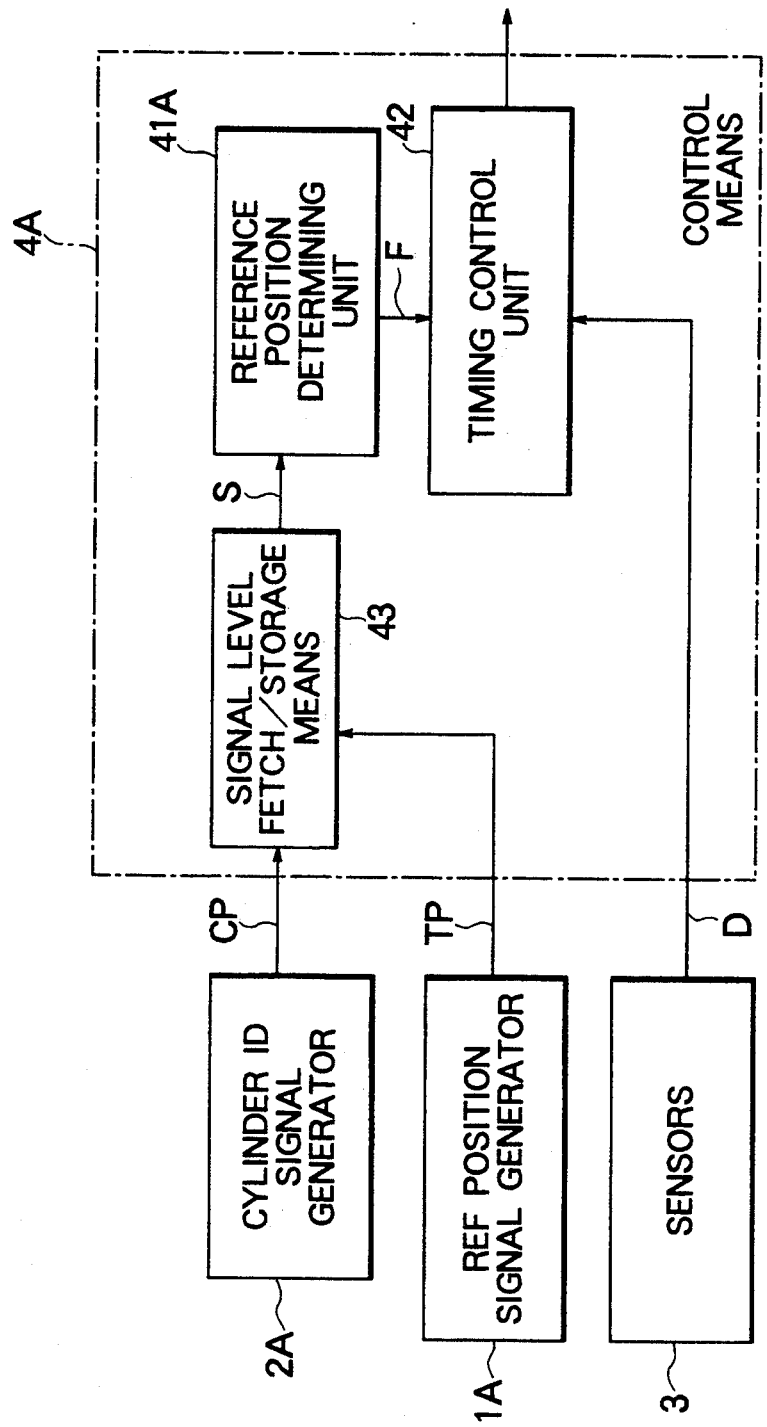
FIG. 1 is a block diagram showing schematically an arrangement of an engine control apparatus according to an embodiment of the present invention.

FIG. 1 shows in a schematic block diagram a general arrangement of the engine control apparatus according to a first embodiment of the present invention. In this figure, reference symbols 1A, 2A, 4A and 41A denote components which correspond, respectively, to the reference (REF) position signal generating means 1, the cylinder identification (ID) signal generating means 2, the control means 4 and the reference position determination unit 41 described hereinbefore. Further, reference numerals 3 and 42 denote the like or same components also mentioned previously in conjunction with the related art.

Figure 2:
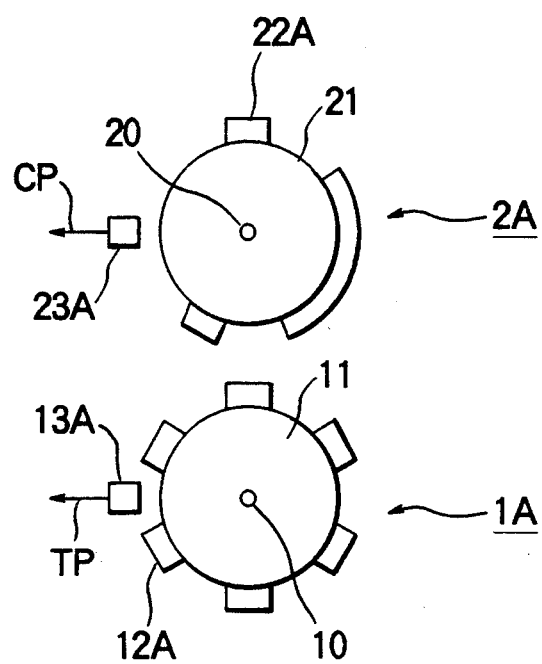
FIG. 2 is a front view showing schematically exemplary structures of a reference position generating means and a cylinder identification means, respectively, which can be employed in the control apparatus shown in FIG. 1.

FIG. 2 is a front view showing schematically exemplary structures of the reference position signal generating means 1A and the cylinder identification signal generating means 2A. In this figure, a reference numeral 10 designates the crank shaft mentioned previously. The cam shaft 20 is operatively connected to the crank shaft 10 of the engine through the medium of a mechanical transmission means such as a combination of a chain and sprockets, a belt and pulleys, a gear train or the like so that the cam shaft 20 rotates once during a period in which the crank shaft 10 rotates twice.

A signal disk 11 mounted on the crank shaft 10 for rotation therewith is provided with six teeth or projections 21A formed along the peripheral edge with equi-distance therebetween. A photosensor 13A is disposed in opposition to the path which the teeth or projections 12A follows upon rotation of the signal disk 11. Thus, the signal disk 11 with the six projections 12A cooperates with the photosensor 13A to constitute the reference position signal generating means 1A for generating a reference position signal TP containing six equi-interval rectangular pulses per rotation of the crank shaft 10 on the assumption that the engine under consideration includes four cylinders.

On the other hand, a signal disk 21 mounted on the cam shaft 20 for rotation therewith is provided with, for example, three projections 22A along the peripheral edge thereof with different angular distances. A second photosensor 23A is disposed in opposition to the path which the projections 22A follow upon rotation of the signal disk 21. The signal disk 21 cooperates with the photosensor 23A to constitute the cylinder identification signal generating means 2A for generating a cylinder identification signal CP containing three different-interval pulses per rotation of the cam shaft 20.

In a modification of the reference position generating means 1A and the cylinder identification signal generating means 2A, the projections 12A and 22A may be replaced by corresponding arcuate slits formed in the signal disks 11 and 12 with the photosensors 12A and 33A being replaced, respectively, by combinations each comprised of a light emitting element and a light receiving element.

Figure 3:
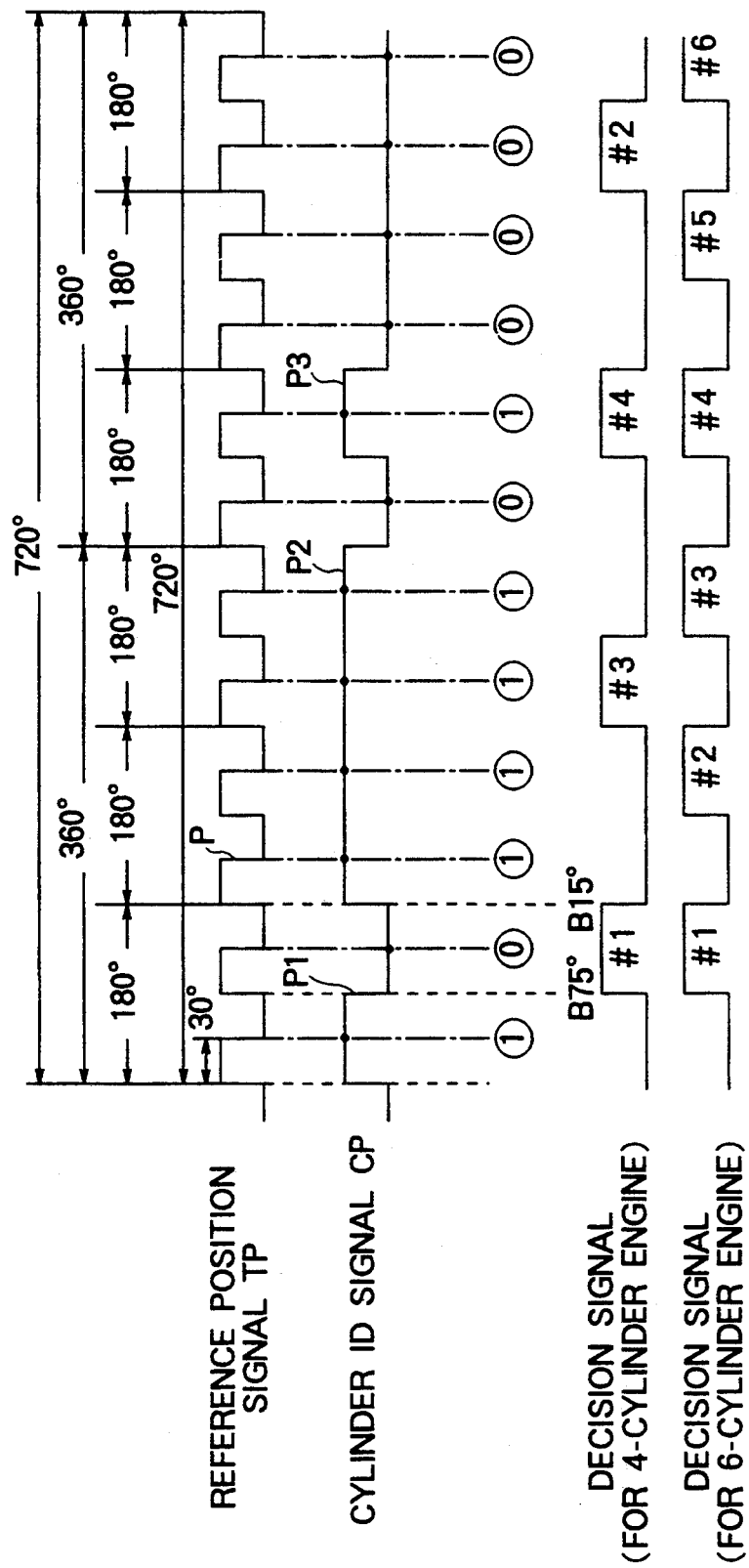
FIG. 3 is a timing chart for illustrating operation of the engine control apparatus.

FIG. 3 is a timing chart for illustrating the reference position signal TP, the cylinder identification signal CP and the decision signal F.

Referring to this figure, the reference position signal TP is comprised of rectangular pulses P each having a duty cycle of ½ and generated at an equi-interval. During a single rotation of the crank shaft 10 (i.e., during a period corresponding to the crank angle of 360°), six of these equi-interval rectangular pulses P are generated, because the signal disk 11 having the six projections 12A is mounted on the crank shaft 10, as mentioned previously. Consequently, the equi-distant rectangular pulse P has a pulse period of 60° and a pulse width of 30°, respectively, in terms of the crank angle and hence the duty cycle or ratio of ½.

On the other hand, the cylinder identification signal CP contains different-interval rectangular pulses P1 to P3. During one rotation of the interlocked shaft or the cam shaft 20 in the case of this embodiment (i.e., during a period corresponding to the rotation of the crank shaft over 720°), theses three pulses P1, P2 and P3 are generated, as will readily be understood from FIG. 2. In this case, each of the first and third different-interval rectangular pulses P1 and P3 has a pulse width of 60°, while that of the second different-interval rectangular pulse P2 is 240° in terms of crank angle, wherein the pulse periods of these pulses P1, P2 and P3 are set at 120°, 300° and 300°, respectively.

Turning back to FIG. 1, the control means 4A includes a signal-level-data storage unit 43 which fetches the cylinder identification signal CP for storing successively the signal levels of the cylinder identification signal while updating the signal levels at every one edge (e.g., at the trailing or falling edges) of the equi-interval rectangular pulses P, respectively, which are contained in the reference position signal TP, to thereby output a signal-level-series signal S which is then supplied to the reference position determination unit 41A also incorporated in the control means 4A. The reference position determination unit 41A decides or determines the reference positions for the individual cylinders, respectively, on the basis of every successive series of four signal levels of the cylinder identification signal CP and the reference position signal TP to thereby generate the decision signal F indicating the reference positions of individual cylinders for the control thereof.

Figures 4, 5:
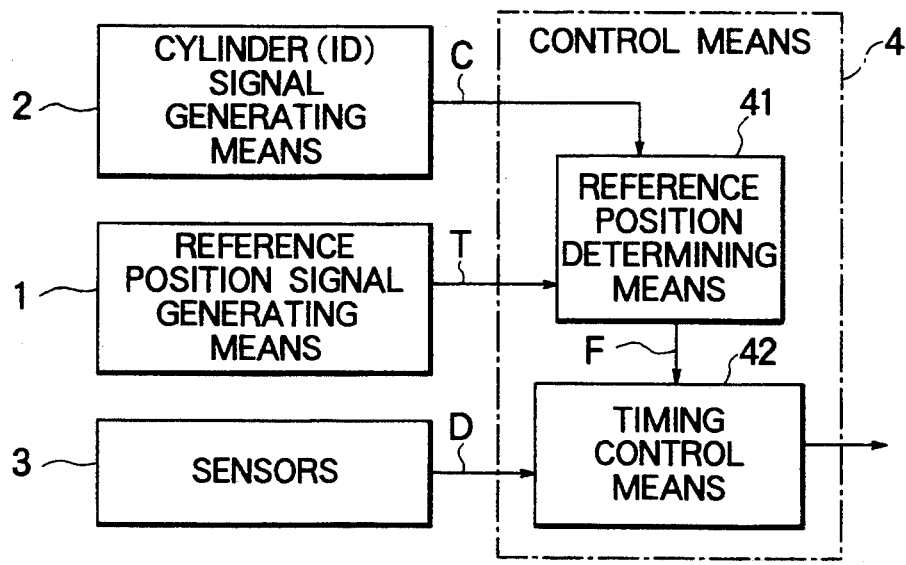
FIG. 4 is a table chart for illustrating operation for determining cylinder reference positions performed in the engine control apparatus shown in FIG. 1.
FIG. 5 is a block diagram showing an engine control apparatus known heretofore.
Figure 6:
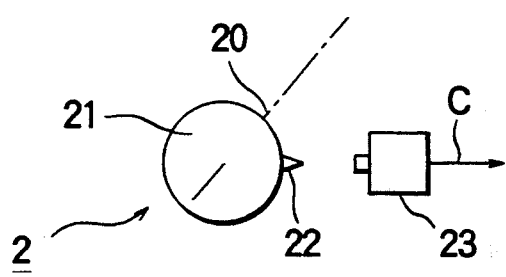
FIG. 6 is a perspective view showing typical structures of the reference position signal generating means and the cylinder identification signal generating means shown in FIG. 5.
Figure 6:
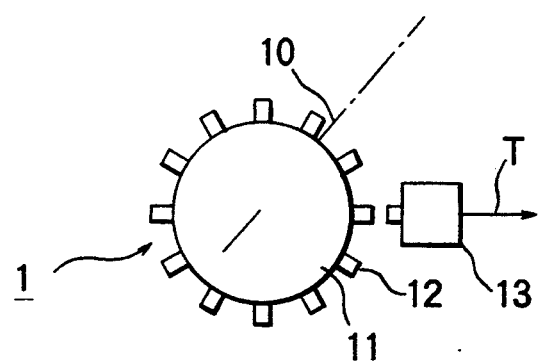

FIG. 4 is a view for illustrating operation of the reference position determination unit 41 for generating the decision signal F. In the figure, reference symbols A1 to D0 represent hexadecimal data stored sequentially in the successive signal level series storage unit 43. In this case, the storage unit 43 is imparted with a capacity of eight bits for storing the signal-level data S of the cylinder identification signal CP fetched at the current sampling time point n and the preceding sampling time points (n−1) to (n−7), respectively.

Next, operation of the engine control apparatus shown in FIG. 1 will be elucidated by reference to FIGS. 2 to 4.

In accompanying the rotation of the engine, the crank shaft 10 and hence the cam shaft 20 are rotated, resulting in that the teeth or projections 12A and 22A of the signal disks 11 and 12 pass by the associated photosensors 12A and 23A, respectively. As a result of this, the reference position signal TP and the cylinder identification signal CP having the pulse waveforms illustrated in FIG. 3 are generated from the outputs of the photosensors 13A and 23A, respectively, and supplied to the signal level data storage unit 43 incorporated in the control means 4A.

The signal level data storage unit 43 fetches or samples the signal level of the cylinder identification signal CP at each of the one edges, e.g., at every trailing edge of the equi-interval rectangular pulses P of the reference position signal TP and stores the fetched or sampled signal level data as serial eight-bit data in such a manner as illustrated in FIG. 4.

At this juncture, it should be repeated that the reference position signal TP is comprised of the equiinterval rectangular pulses P, while the cylinder identification signal CP is comprised of the different-interval rectangular pulses P1, P2 and P3 which are so generated that successive series of the signal levels each including four successive signal levels sampled from the cylinder identification signal CP at every four successive trailing edges of the equi-interval rectangular pulses differ from one another. Thus, the signal level data S fetched at every crank angle of 60° (i.e., at every trailing edge of the reference position signal pulses P) differ from every last updated data represented by four successive bits.

The reference position determination unit 41A decides or determines the reference positions for the individual cylinders on the basis of every four last updated signal levels sampled at the time points (n−3) to n contained in the signal level data S supplied from the signal level data storage unit 43, whereby the decision signal F is generated. In other words, the reference position determination unit 41A converts the time points at which the trailing edge and the leading edge of the reference position signal TP are detected to the crank angles representing the reference positions for the individual cylinders on the basis of the updated series of the signal level data each consisting of four bits.

By way of example, let's assume that the signal level series of four bits fetched at the sampling time points (n−3), (n−2), (n−1) and n, respectively, are represented by "0001". In that case, the time point corresponding to the trailing edge of the reference position signal pulse P at which the signal level "1" is fetched or sampled represents the reference position of B105° for the cylinder #1 and the time point corresponding to the leading edge of the succeeding reference position signal pulse P represents the reference position of B75° for the cylinder #1. Similarly, when the signal level data of four successive bits are given by "0010", the time point corresponding to the trailing edge of the reference position signal pulse P at which the latest signal level "0" is fetched represents the reference position of B45° for the cylinder #1, while the time point corresponding to the leading edge of the succeeding pulse P represents the reference position of B15° for the cylinder #1.

In this manner, reference positions corresponding to 24 discrete detection time points can be determined during the period corresponding to the crank angle of 720°, whereby the corresponding decision signal F is generated to be supplied to the timing control unit 42.

In this conjunction, it should be noted that the time taken for the determination or identification of the individual cylinders lies within a period corresponding to the crank angle of 240° (=60°×4).

The timing control unit 42 detects the reference positions for the individual cylinders under monitoring control on the basis of the decision signal F, as described hereinbefore, to calculate the control timings such as the ignition timings in dependence on the engine operation state D and output the corresponding control signal.

As will now be appreciated from the above description, with the arrangement of the engine control apparatus according to the instant embodiment of the invention, the signal levels of the cylinder identification signal CP comprised of the different-interval rectangular pulses generated in synchronism with the rotation of the cam shaft 20 are sampled and fetched at the edges of the equiinterval rectangular pulses P contained in the reference position signal TP in the number of six per rotation of the crank shaft, whereon the reference positions for the individual cylinders are determined on the basis of the signal level series S containing a series of predetermined successive levels as sampled. The timing control such as the ignition timing control for the engine can be performed on the basis of the decision signal F. Parenthetically, A15 and A45 shown in FIG. 4 represent other reference positions of the cylinders for other control purposes such as the fuel injection control.

At this juncture, it should be noted that superposition of pulse-like noise of short duration on the rectangular pulses P and P1 to P3 will exert no adverse influence so long as noise generation is out of synchronism with the edges of the equi-interval rectangular pulses P of the reference position signal TP. Further, even when noise generated synchronously with the edge of the pulse P of the reference position signal TP is superposed, erroneous determination of the reference positions of the cylinder can be avoided by predicting the succeeding signal level series S on the basis of the latest bit of the eight-bit data stored constantly in the fetch/store unit 43 and performing correction based on the result of the prediction.

Thus, the reference positions for the individual cylinders of the engine can be detected or determined within a relatively short time with high accuracy without suffering from error due to the noise, whereby the engine operation control can be achieved with enhanced reliability.

Many features and advantages of the present invention are apparent form the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. By way of example, although the invention has been described in conjunction with the four-cylinder internal combustion engine, the teachings of the invention can be applied to so-called multi-cylinder engines including a three-cylinder engine, a six-cylinder engine and a twelve-cylinder engine in more general terms within the skill of the those having ordinary knowledge in the art. Incidentally, a decision signal F' having a pulse waveform shown in FIG. 3 is for a six-cylinder engine. Accordingly, all suitable modifications and equivalents may be resorted to, falling within the scope of the invention.

I claim:

1. An apparatus for controlling operation of an internal combustion engine including a plurality of cylinders, comprising:
    reference position signal generating means for generating a reference position signal indicating reference positions for the individual cylinders of said engine in synchronism with rotation of a crank shaft of said engine;

cylinder identification signal generating means for generating a cylinder identification signal for identifying the engine cylinders in synchronism with rotation of a shaft interlocked to said crank shaft and having a rotation frequency (rpm) corresponding to a half of that of said crank shaft; and control means for controlling operation of said engine cylinders on the basis of the reference position signal and the cylinder identification signal;

wherein said reference position signal is comprised of equi-interval rectangular pulses each having a duty cycle of ½ and generated in the number of six during each rotation of said crank shaft, while said cylinder identification signal including different-interval rectangular pulses is generated a number of times during a single rotation of the interlocked shaft at a given one edge of said equi-interval rectangular pulse such that said different-interval rectangular pulse signal includes series each of four signal levels, said series differing from one another; and wherein said control means includes:

signal level data storage means for storing the signal levels of said cylinder identification signal at every one edge of the equi-interval rectangular pulses of said cylinder reference position signals;

reference position decision means for determining the reference positions for said individual cylinders on the basis of four successive values of said signal levels for thereby generating a decision signal; and timing control means for controlling operation of said individual cylinders on the basis of said decision signal.

2. An engine operation control apparatus according to claim 1, wherein said interlocked shaft is a cam shaft operatively connected to said crank shaft of said engine.

3. An engine operation control apparatus according to claim 1, said engine including four cylinders, wherein said reference position signal generating means includes a first disk mounted on said crank shaft for rotation therewith and having six projections formed along an outer peripheral edge of said disk, each of said projections extending over 30° in terms of crank angle with equidistance of 30° in terms therebetween, and detecting means for detecting said projections to thereby generate said equiinterval rectangular pulses contained in said reference position signal; and wherein said cylinder identification signal generating means includes a second signal disk mounted on a cam shaft operatively connected to said crank shaft for rotation in synchronism with said cam shaft and having three projections formed along an outer peripheral edge of said second signal disk, said projections including a first projection extending over 60° in terms of crank angle with a rise-up edge thereof being positioned so as to angularly coincide with a rise-up edge of a given projection of said first disk, a second projection extending over 240° with an angular distance of 60° from a trailing edge of said first projection and a third projection extending over 60° with an interval of 60° from a trailing edge of said second projection, and detecting means for detecting said first, second and third projections for thereby generating said different-interval rectangular pulses contained in said cylinder identification signal.

4. An engine operation control apparatus according to claim 1, said engine including four cylinders, wherein said reference position signal generating means includes a first disk mounted on said crank shaft for rotation therewith and having six arcuate slits formed in an outer peripheral portions of said disk, each of said slits extending over 30° in terms of crank angle with equidistance of 30° in terms therebetween, and photoelectric detecting means for detecting said slits to thereby generate said equiinterval rectangular pulses contained in said reference position signal; and wherein said cylinder identification signal generating means includes a second signal disk mounted on a cam shaft operatively connected to said crank shaft for rotation in synchronism with said cam shaft and having three arcuate slits formed in an outer peripheral edge portion of said second signal disk, said slits including a first slit extending over 60° in terms of crank angle with a start edge thereof being positioned so as to angularly coincide with a start edge of a given slit of said first disk, a second slit extending over 240° with an angular distance of 60° from a terminal edge of said first slit, and a third slit extending over 60° with an interval of 60° from a terminal edge of said second slit, and photoelectric detecting means for detecting said first, second and third slits for thereby generating said different-interval rectangular pulses contained in said cylinder identification signal.

5. An engine operation control apparatus according to claim 1, wherein said reference position determining unit is adapted to sample and store four successive signal levels of said cylinder identification signal at first successive edges of said equi-interval regular pulses of said reference position signal for thereby generate the reference position signals each of four bits for the identification and control of the individual cylinders of said engine on the basis of successive series of said signal levels.

6. An engine operation control apparatus according to claim 1, wherein said internal combustion engine is one selected from a group consisting of a three-cylinder engine, a four-cylinder engine, a six-cylinder engine, an eight-cylinder engine and a twelve-cylinder engine.

* * * * *